(12) United States Patent
Ross

(10) Patent No.: US 7,957,870 B2
(45) Date of Patent: Jun. 7, 2011

(54) TORQUE DISTRIBUTION SYSTEM FOR A VEHICLE

(75) Inventor: Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 455 days.

(21) Appl. No.: 12/014,954

(22) Filed: Jan. 16, 2008

(65) Prior Publication Data

US 2009/0182474 A1 Jul. 16, 2009

(51) Int. Cl.
*G06F 7/00* (2006.01)

(52) U.S. Cl. ........... 701/53; 701/22; 701/84; 477/3; 477/35; 477/39; 475/84; 180/242

(58) Field of Classification Search ............ 701/22, 701/51, 53, 84; 477/3, 34, 39, 35; 903/905; 475/5, 84, 150, 221; 180/242

See application file for complete search history.

(56) References Cited

U.S. PATENT DOCUMENTS

| | | | |
|---|---|---|---|
| 5,387,161 A * | 2/1995 | Shibahata | 475/5 |
| 5,409,425 A * | 4/1995 | Shibahata | 475/5 |
| 5,899,286 A * | 5/1999 | Yamaguchi | 180/65.21 |
| 6,081,042 A | 6/2000 | Tabata et al. | |
| 6,830,529 B2 * | 12/2004 | Phelan et al. | 475/221 |
| 7,340,330 B2 * | 3/2008 | Okoshi et al. | 701/22 |
| 2003/0104892 A1 | 6/2003 | Porter | |
| 2006/0166775 A1 | 7/2006 | Gradu | |
| 2010/0323838 A1 | 12/2010 | Rosemeier et al. | |

FOREIGN PATENT DOCUMENTS

| | | |
|---|---|---|
| DE | 4111615 A1 | 10/1992 |
| DE | 19712246 A1 | 11/1997 |
| DE | 102007055882 A1 | 6/2009 |

* cited by examiner

*Primary Examiner* — Gertrude Arthur Jeanglaud
(74) *Attorney, Agent, or Firm* — Quinn Law Group, PLLC

(57) ABSTRACT

A torque distribution system is provided for a vehicle that uses a planetary gear set, an electric motor, and a torque-transmitting mechanism to control a torque difference between two axially-aligned wheels on a vehicle. The torque distribution system includes a planetary gear set having a first, a second, and a third member. The torque-transmitting mechanism is selectively engagable to connect the first and second members of the planetary gear set for common rotation. The second and third members of the planetary gear set are continuously operatively connected with the first and second rotatable connecting elements, respectively. The motor is continuously connected with the first member of the planetary gear set such that the motor adds or subtracts torque to the first member when the motor is energized and also adds or subtracts torque to the second member when the motor is energized and the torque-transmitting mechanism is engaged.

13 Claims, 5 Drawing Sheets

TORQUE DISTRIBUTION SYSTEM FOR A VEHICLE

TECHNICAL FIELD

The invention relates to a torque distribution system for a vehicle, particularly for introducing a difference in torque between two axially-aligned wheels.

BACKGROUND OF THE INVENTION

The ability to control torque distribution among the wheels of a vehicle improves vehicle traction and control of a vehicle. Vehicle yaw may be controlled by controlling a torque difference between two axially-aligned wheels, such as with an electronic slip differential. Torque distribution systems, also referred to as torque biasing systems, include limited slip differentials having a clutch that is engagable to transfer torque between left and rights wheels and active-on-demand systems, also utilizing a selectively engagable clutch, to transfer torque between front and rear wheels.

SUMMARY OF THE INVENTION

A torque distribution system is provided for a vehicle that uses a planetary gear set, an electric motor, and a torque-transmitting mechanism to control a torque difference between two axially-aligned wheels on a vehicle. The planetary gear set has a first, a second, and a third member. The torque-transmitting mechanism is selectively engagable to connect the first and second members of the planetary gear set for common rotation. The second and third members of the planetary gear set are continuously operatively connected with the first and second rotatable connecting elements, respectively. The motor is continuously connected with the first member of the planetary gear set such that the motor varies (i.e., adds or subtracts) torque to the first member when the motor is energized and also adds torque to the second member when the motor is energized and the torque-transmitting mechanism is engaged. The motor, the planetary gear set and the torque-transmitting mechanism are thereby configured to cause a difference in torque at the rotatable connecting elements when the clutch is disengaged. The torque distribution system may be connected with the driven wheels (i.e., driven by a power source, such as an engine) or the undriven wheels of a vehicle. When the power source is off and the torque-transmitting mechanism is engaged, the motor may be used in an electric-only mode to drive the first and second rotatable connecting elements. When the torque-transmitting mechanism is engaged and the power source is on, the motor may also be used in tandem with the power source for launch assist, and for regenerative braking. The motor may be operatively connected with the transmission in a hybrid electromechanical arrangement. In various embodiments, the torque distribution system is used in connection with a differential mechanism or a compound planetary gear set to interconnect to the axially-aligned vehicle wheels.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
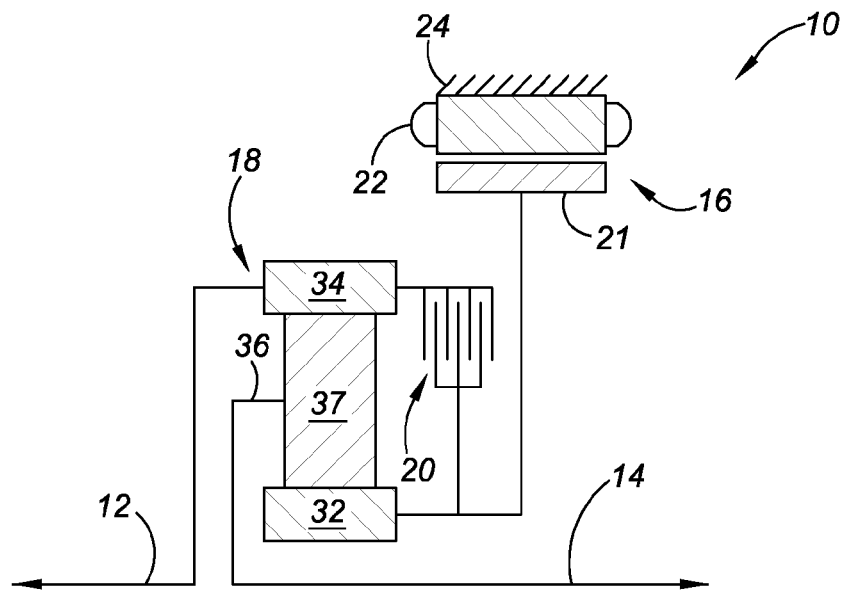
FIG. 1 is a schematic illustration in cross-sectional fragmentary view of a first embodiment of a torque distribution system.
Figure 2:
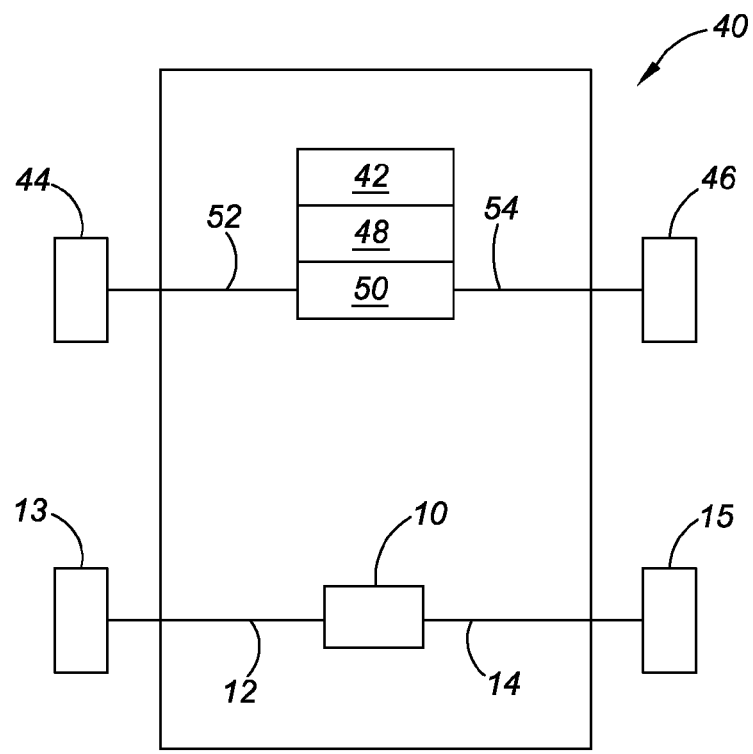
FIG. 2 is a schematic illustration in plan view of a front wheel-drive vehicle having the torque distribution system of FIG. 1 operatively connected to unpowered rear wheels of the vehicle.

Referring to the drawings, wherein like reference numbers refer to like components, FIG. 1 shows a torque distribution system 10 operatively connected to two axially-aligned, rotatable connecting elements 12 and 14, such as wheel axles, each operatively connected to an opposing vehicle wheel, such as rear wheels 13 and 15 on vehicle 40 in FIG. 2, for controlling a torque difference between the rotatable connecting elements 12, 14. The torque distribution system 10 includes an electric motor 16 that is preferably but not necessarily operable as a generator, a planetary gear set 18, and a torque-transmitting mechanism 20. In this embodiment, the torque-transmitting mechanism 20 is a friction clutch. The electric motor 16 includes a rotatable rotor 21 and a non-rotatable stator 22. The stator 22 is fixed to a stationary member 24, such as a vehicle frame. The planetary gear set 18 includes a sun gear member 32, a ring gear member 34, and a carrier member 36 that rotatably supports pinion gears 37 that mesh with both the sun gear member 32 and the ring gear member 34. The sun gear member 32, the ring gear member 34, and the carrier member 36 are referred to herein as the first, second and third members of the planetary gear set 18, respectively. The rotor 21 is continuously connected for common rotation with the sun gear member 32. The torque-transmitting mechanism 20 is selectively engagable to connect the rotor 21 and the sun gear member 32 for common rotation with the ring gear member 34.

When the torque-transmitting mechanism 20 is disengaged and the motor 16 is electrically energized, the motor 16 adds torque to the rotatable connecting element 14, at a torque ratio determined by the gear tooth counts of the ring gear member 34 and sun gear member 32. This introduces a difference in torque between rotatable connecting elements 12 and 14, detected as a change in vehicle yaw, commonly referred to as torque vectoring. If the torque-transmitting mechanism 20 is engaged, the planetary gear set 18 is locked with all members rotating at the same speed, and the motor 16 may be energized to add torque to both rotatable connecting elements 12, 14. This induces an understeer. With the torque-transmitting mechanism 20 engaged, the motor 16 may be used to assist launch of vehicle 40, and improve low traction driving. The motor 16 may drive the vehicle in an electric-only mode when the main power source, such as an engine, is off. Alternatively, the motor 16 may be controlled to operate as a generator, converting torque at the rotatable connecting element 14 into electrical energy to be sent to a storage device, such as a battery (not shown) connected to the stator 22. This may occur during a regenerative braking mode when the vehicle 40 of FIG. 2 is braked, to help slow the wheels 13, 15.

Referring to FIG. 2, the torque distribution system 10 is shown installed on vehicle 40. The vehicle 40 is a front wheel drive vehicle, having as a power source 42 an engine powering front wheels 44 and 46 through a transmission 48 and a differential mechanism 50 connected to rotatable connecting elements (i.e., wheel shafts or axles) 52, 54. The power source 42 may alternatively be a fuel cell. In this embodiment, the torque distribution system 10 is operable to add, remove and control (left wheel 13 to right wheel 15) torque to the undriven rear wheels 13, 15.

Figure 3:
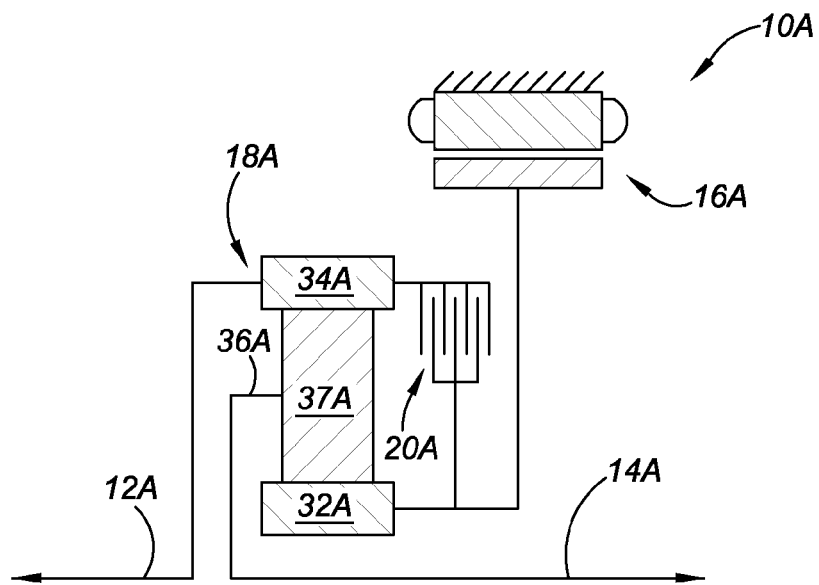
FIG. 3 is a schematic illustration in cross-sectional fragmentary view of a second embodiment of a torque distribution system.
Figure 4:
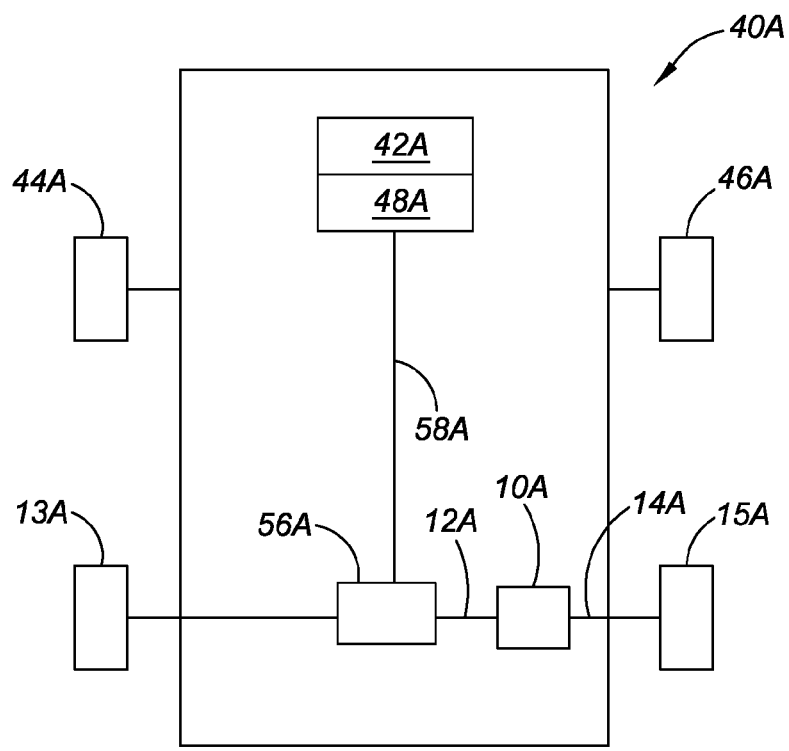
FIG. 4 is a schematic illustration in plan view of a rear wheel-drive vehicle having the torque distribution system of FIG. 3 operatively connected to rear wheels of the vehicle.

Referring to FIG. 3, an alternative embodiment of a torque distribution system 10A is configured to be installed on a rear wheel drive vehicle 40A of FIG. 4 to add torque to the driven rear wheels 13A, 15A. The torque distribution system 10A of FIG. 3 includes a planetary gear set 18A, a motor 16A and a torque-transmitting mechanism 20A, each configured to function substantially identically as the corresponding components of torque distribution system 10 of FIG. 1. The planetary gear set 18A includes a sun gear member 32A continuously connected for rotation with a rotor of motor 16A, a ring gear member 34A continuously connected for rotation with rotatable connecting element 12A, and a carrier member 36A rotatably supporting pinion gears 37A that mesh with both the sun gear member 32A and the ring gear member 34A. The carrier member 36A is connected for common rotation with rotatable connecting element 14A. As illustrated in FIG. 4, vehicle 40A is a rear wheel drive vehicle, with a rear differential 56A that transfers to rear wheels 13A, 15A, power that is received via a drive shaft 58A driven by the power source 42A through transmission 48A. The torque distribution system 10A is installed between the rear differential 56A and right rear wheel 15A, with the rotatable connecting element 12A being a connecting member between the torque distribution system 10A and the differential 56A, and the rotatable connecting element 14A being a wheel axle between the torque distribution system 10A and the right rear wheel 15A. Unpowered front wheels 44A, 46A are not operatively connected to one another, but are connected with the vehicle 40A via bearings (not shown) and additional components as is known for undriven wheels. The motor 16A of the torque distribution system 10A may be a motor/generator operable in a regenerative braking mode to convert torque of the rotatable connecting elements 12A, 14A into stored electrical power during braking to slow the wheels 13A, 15A when the torque transmitting mechanism 20A is engaged. With the torque-transmitting mechanism 20A engaged, the motor 16A may be used to assist launch of vehicle 40A, and improve low traction driving. Additionally, the motor 16A may drive the vehicle 40A in an electric-only mode when the power source 42A is off and torque-transmitting mechanism 20A is engaged. The motor 16A of the torque distribution system 10A may be operatively connected with the transmission 48A and controlled to operate with the power source 42A to establish different modes, such as an electrically-variable or electric-only mode to establish a hybrid electric-only transmission 48A.

Figure 5:
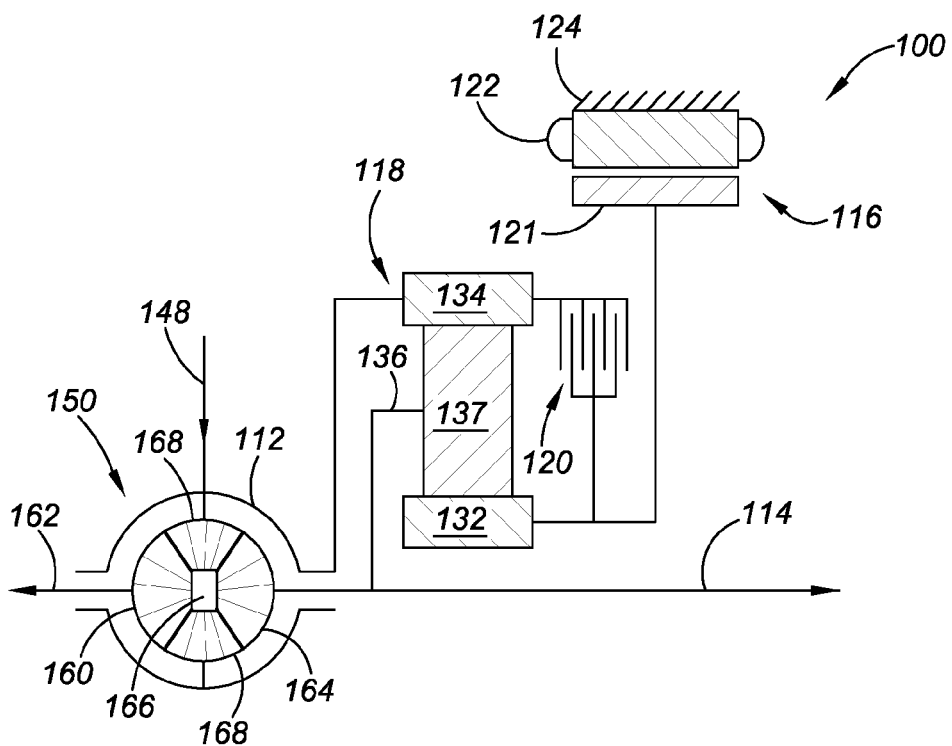
FIG. 5 is a schematic illustration in cross-sectional fragmentary view of a third embodiment of a torque distribution system.

Referring to FIG. 5, another embodiment of a torque distribution system 100 is illustrated. The torque distribution system 100 is operatively connected to two rotatable connecting elements 112 and 114, each operatively connected to a respective, axially-aligned opposing vehicle wheel, such as front wheels 144 and 146 on vehicle 140 in FIG. 7, for controlling a torque difference between the rotatable connecting elements 112, 114. The torque distribution system 100 includes an electric motor 116, also operable as a generator, a planetary gear set 118, and a torque-transmitting mechanism 120, which in this embodiment is a friction clutch. The electric motor 116 includes a rotatable rotor 121 and a non-rotatable stator 122. The stator 122 is fixed to a stationary member 124, such as a vehicle frame. The planetary gear set 118 includes a sun gear member 132, a ring gear member 134, and a carrier member 136 that rotatably supports pinion gears 137 that mesh with both the sun gear member 132 and the ring gear member 134. The sun gear member 132, the ring gear member 134, and the carrier member 136 are referred to herein as the first, second and third members of the planetary gear set 118, respectively. The rotor 121 is continuously connected for common rotation with the sun gear member 132. The torque-transmitting mechanism 120 is selectively engagable to connect the rotor 121 and the sun gear member 132 for common rotation with the ring gear member 134. Alternatively, the carrier member 136 may support two sets of pinions, a first set meshing with the sun gear member 132, and a second set meshing with the first set and with the ring gear member 134, making planetary gear set 118 a double pinion gear set similar to planetary gear set 250 of FIG. 8.

The torque distribution system 100 is connected to a differential mechanism 150 that includes the rotatable connecting element 112 as a differential carrier member that supports a left side gear 160 connected for rotation with a drive shaft 162, as well as a right side gear 164 connected for rotation with the rotatable connecting element 114 (serving as a right drive shaft). A driving torque (such as from the transmission 148 of FIG. 7) is connected for rotation with pinion shaft 166 on which rotate pinion gears 168 that mesh with the side gears 160, 164.

When the torque-transmitting mechanism 120 is disengaged and the motor 116 is electrically energized, the motor 116 adds torque to the rotatable connecting element 114, at a torque ratio determined by the gear tooth counts of the ring gear member 134 and sun gear member 132, introducing a torque difference between the rotatable connecting element and the drive shaft 162. If the torque-transmitting mechanism 120 is engaged, the planetary gear set 118 is locked with all members rotating at the same speed, and the motor 116 may be energized to add torque to both rotatable connecting elements 112, 114. The motor 116 of the torque distribution system 100 may be a motor/generator operable as a generator in a regenerative braking mode to convert torque of the rotatable connecting elements 112, 114 into stored electrical power during braking to slow the wheels 144, 146 when the torque transmitting mechanism 120 is engaged. With the torque-transmitting mechanism 120 engaged, the motor 116 may be used to assist launch of vehicle 140, and improve low traction driving. Additionally, the motor 116 may drive the vehicle 140 in an electric-only mode when a power source 142 such as an engine is off and torque-transmitting mechanism 120 is engaged. The transmission 148 and motor 116 may be operatively connected such that the transmission 148 operates as a hybrid electromechanical transmission with different operating modes, such as an electrically-variable operating mode powered by both the power source 142 and the motor 116.

Figure 7:
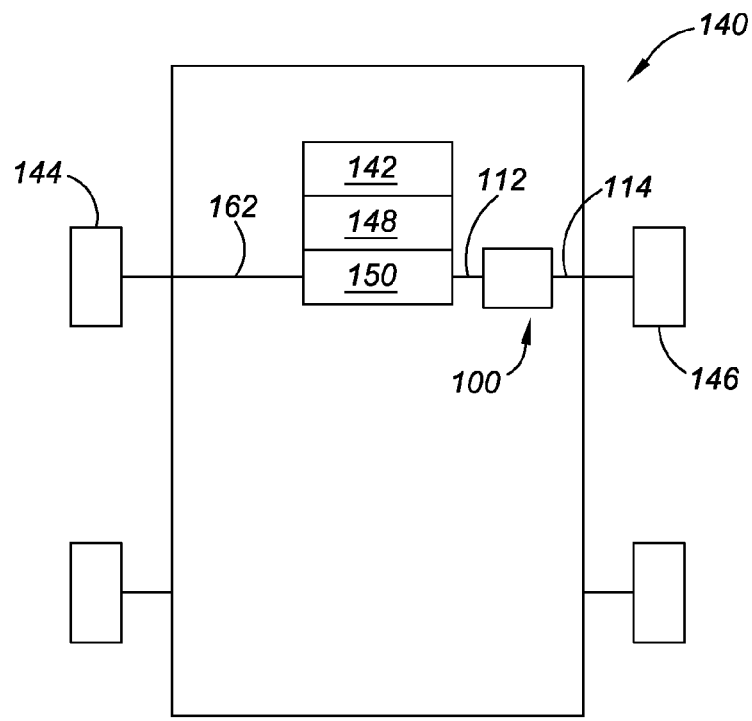
FIG. 7 is a schematic illustration in plan view of a front wheel-drive vehicle having the torque distribution system of FIG. 5 operatively connected to front wheels of the vehicle.

Referring to FIG. 7, the torque distribution system 100 is shown installed on vehicle 140. The vehicle 140 is a front wheel drive vehicle, having a power source 142 such as an engine driving front wheels 144 and 146 through transmission 148 and differential mechanism 150. In this embodiment, the torque distribution system 100 is operable to add torque to the driven rear wheels 144, 146, either equally (if torque-transmitting mechanism 120 is engaged) or with a torque difference therebetween (if torque-transmitting mechanism 120 is not engaged).

Figure 6:
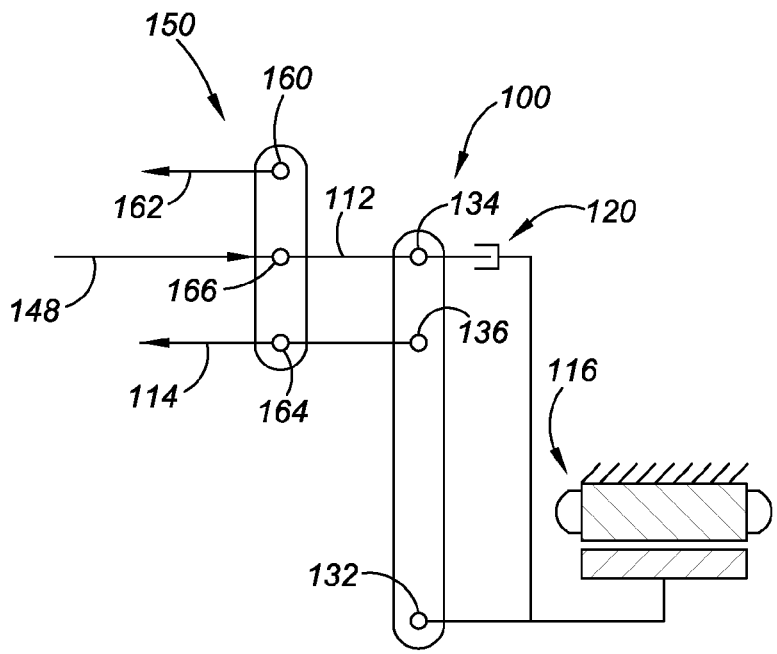
FIG. 6 is a schematic illustration of a lever diagram representing the torque distribution system of FIG. 5.

Referring to FIG. 6, the torque-distributions system 100 and differential mechanism 150 are shown in lever diagram form, as is understood by those skilled in the art of automotive powertrain design. The torque distribution system 100 is represented as a three-node lever, with the sun gear member 132, ring gear member 134 and carrier member 136 establishing nodes. The differential mechanism 150 is also representable as a three-node lever, with the pinion shaft 166 and the side gears 160, 164, establishing nodes of the lever. The rotatable connecting element 112 connects the sun gear member 134 with the pinion shaft 166, to which torque may also be added by power source through the transmission 148. The carrier member 136 rotates with the side gear 164.

Figure 8:
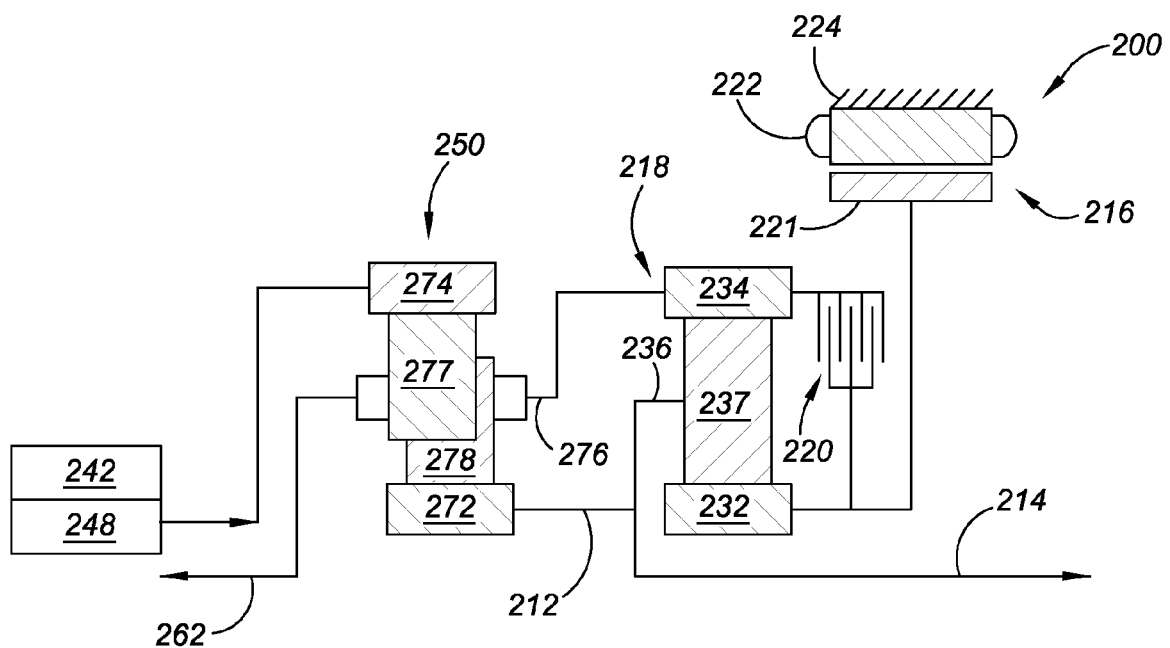
FIG. 8 is a schematic illustration in cross-sectional fragmentary view of a fourth embodiment of a torque distribution system.

Referring to FIG. 8, another embodiment of a torque distribution system 200 is shown operatively connected to a compound planetary gear set 250 such as may be used to distribute driving torque from a power source 242 and transmission 248, to two rotatable connecting elements 212, 214. The torque distribution system 200 includes an electric motor 216, also operable as a generator, a planetary gear set 218, and a torque-transmitting mechanism 220, which in this embodiment is a friction clutch. The electric motor 216 includes a rotatable rotor 221 and a non-rotatable stator 222. The stator 222 is fixed to a stationary member 224, such as a vehicle frame. The planetary gear set 218 includes a sun gear member 232, a ring gear member 234, and a carrier member 236 that rotatably supports pinion gears 237 that mesh with both the sun gear member 232 and the ring gear member 234. The sun gear member 232, the ring gear member 234, and the carrier member 236 are referred to herein as the first, second and third members of the planetary gear set 218, respectively. The rotor 221 is continuously connected for common rotation with the sun gear member 232. The torque-transmitting mechanism 220 is selectively engagable to connect the rotor 221 and the sun gear member 232 for common rotation with the ring gear member 234.

When the torque-transmitting mechanism 220 is disengaged and the motor 216 is electrically energized, the motor 216 adds torque to the rotatable connecting element 214, at a torque ratio determined by the gear tooth counts of the ring gear member 234 and sun gear member 232. If the torque-transmitting mechanism 220 is engaged, the planetary gear set 218 is locked with all members rotating at the same speed, and the motor 216 may be energized to add torque to both rotatable connecting elements 212, 214.

The torque distribution system 200 is connected to the compound planetary gear set 250 on a vehicle, with the rotatable connecting element 212 operatively connected for rotation with a carrier member 276 that rotatably supports two sets of pinion gears 277, 278. Carrier member 276 is connected for common rotation with a wheel axle 262 that is axially-aligned with rotatable connecting element 214. Pinion gears 277 mesh with ring gear member 274 and with pinion gears 278. Pinion gears 278 mesh with sun gear member 272, which is continuously connected for rotation with carrier member 236 and rotatable connecting element 214.

Figure 9:
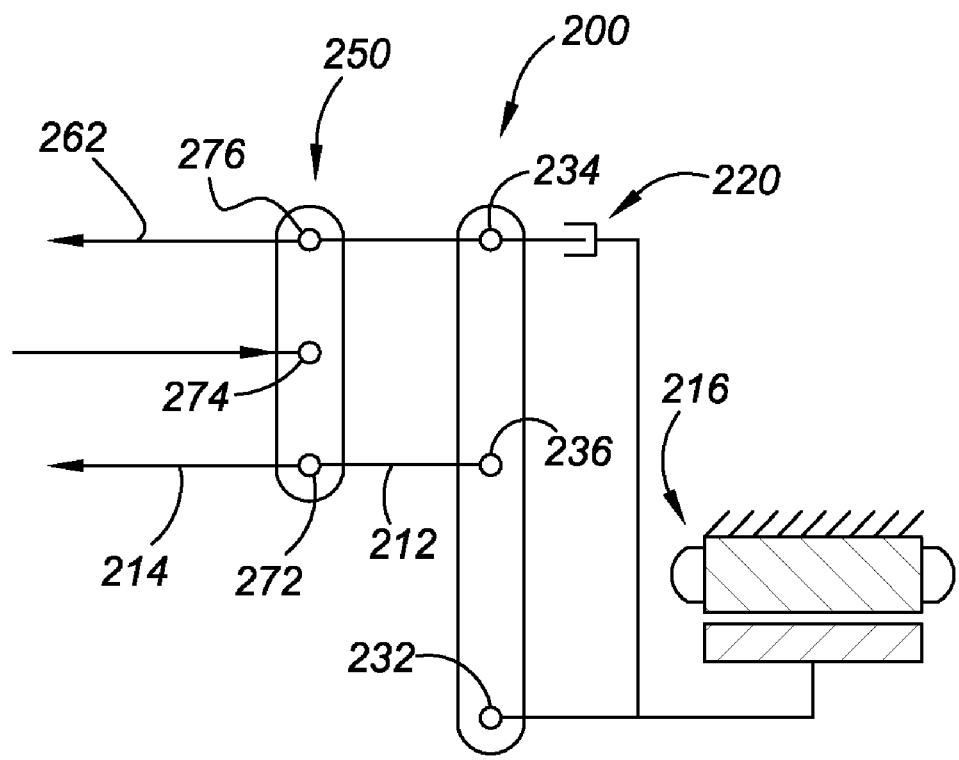
FIG. 9 is a schematic illustration of a lever diagram representing the torque distribution system of FIG. 8.

Referring to FIG. 9, the torque distribution system 200 and compound planetary gear set 250 are shown in lever diagram form, each establishing a three-node lever. The ring gear member 234, carrier member 236 and sun gear member 232 establish three nodes. The lever representing the planetary gear set 250 has three nodes established by the sun gear member 272, the ring gear member 274 and carrier member 276.

The torque distribution system 200 and compound planetary gear set 250 may be installed on a vehicle operatively connected to driven wheels, such as on vehicle 140 of FIG. 7 in place of torque distribution system 100 and differential mechanism 150, in a front-wheel drive arrangement. Alternatively, the torque distribution system 200 and compound planetary gear set 250 may be installed on vehicle 40A of FIG. 4 in place of torque distribution system 10A and rear differential 56A, in a rear-wheel drive arrangement.

When the torque-transmitting mechanism 200 is engaged, the motor 216 of the torque distribution system 200 may be a motor/generator operable as a generator in a regenerative braking mode to convert torque of the rotatable connecting elements 212, 214 into stored electrical power during braking to slow the wheels of a vehicle to which the torque distribution system 200 is connected. With the torque-transmitting mechanism 220 engaged, the motor 216 may be used to assist launch of a vehicle, and improve low traction driving. Additionally, the motor 216 may drive a vehicle in an electric-only mode when the engine or other power source is off and torque-transmitting mechanism 220 is engaged. Alternatively, the motor 216 may be controlled to operate as a generator, converting torque at the rotatable connecting element 214 into electrical energy to be sent to a storage device, such as a battery (not shown) connected to the stator 222.

While the best modes for carrying out the invention have been described in detail, those familiar with the art to which this invention relates will recognize various alternative designs and embodiments for practicing the invention within the scope of the appended claims.

The invention claimed is:

1. A torque distribution system for a vehicle having a first and a second wheel axially-aligned with one another, and first and second rotatable connecting elements continuously operatively connected for rotation with the first and the second wheel, respectively, comprising:
 a planetary gear set having a first, a second and a third member;
 an electric motor;
 a selectively engagable clutch that connects the first and the second members of the planetary gear set for common rotation when engaged;
 wherein the second and third members of the planetary gear set are continuously operatively connected with the first and the second rotatable connecting elements, respectively; and wherein the motor is continuously connected to the first member of the planetary gear set such that the motor adds or subtracts torque to the first member when the motor is energized and adds or subtracts torque to both the first and the second member when the motor is energized and the clutch is engaged; the motor, the planetary gear set and the clutch thereby being configured to cause a difference in torque between the rotatable connecting elements when the clutch is disengaged.

2. The torque distribution system of claim 1, wherein the vehicle further includes a third and a fourth wheel axially-aligned with one another, and a power source; and wherein the power source is drivingly connected with the third and the fourth wheels for providing torque at the third and fourth wheels and is not connected for providing torque at the first and second rotatable connecting elements and first and second wheels.

3. The torque distribution system of claim 2, wherein the vehicle further includes a transmission operatively connected between the third and fourth wheels and the power source; and wherein the motor is also operable as a generator and is operatively connected to the transmission such that the transmission is a hybrid electro-mechanical transmission.

4. The torque distribution system of claim 3, wherein the motor/generator is operable to drive the third and fourth wheels in an electric-only mode when the engine is not energized.

5. The torque distribution system of claim 1, wherein the vehicle further includes a power source; and wherein the power source is drivingly connected for adding torque at the first and second rotatable connecting elements and first and second wheels.

6. The torque distribution system of claim 5, wherein the vehicle further includes a transmission operatively connected between the power source and the first and second rotatable connecting elements; and wherein the motor is also operable as a generator and is operatively connected to the transmission such that the transmission is a hybrid electro-mechanical transmission.

7. The torque distribution system of claim 6, wherein the motor is operable to drive the first and second rotatable connecting elements in an electric-only mode when the power source is not energized.

8. The torque distribution system of claim 1, wherein the planetary gear set is configured such that the motor adds or subtracts the same torque to the first and second rotatable connecting elements when the clutch is engaged.

9. The torque distribution system of claim 1, wherein the vehicle further includes a differential having a first differential member operatively connected for receiving driving torque from an engine, a second differential member operatively connected for driving said first rotatable connecting element via driving torque received through said first differential member, and a third differential member operatively connected for driving said second rotatable connecting element via driving torque received through said first differential member; wherein the second member of the planetary gear set is continuously connected for common rotation with the second differential member; and wherein the third member of the planetary gear set is continuously connected for common rotation with the first differential member.

10. The torque distribution system of claim 1, wherein the motor is operable as a generator in a regenerative braking mode to convert mechanical energy of the first and second rotatable connecting elements into electrical energy.

11. An apparatus for controlling a torque difference between two axially-aligned wheels of a vehicle, comprising:

a planetary gear set having a first, a second and a third member, the second and the third of which are each continuously operatively connected with a different respective one of said wheels;

an electric motor continuously operatively connected to the first of said members and selectively powerable to provide torque at said first member; and a selectively engagable clutch that connects the electric motor to one of the others of said members when engaged, the motor therefore being operable to introduce a difference in torque between the two wheels.

12. The apparatus of claim 11, wherein the planetary gear set is a first planetary gear set, the first member is a first sun gear member, the second member is a first ring gear member, and the third member is a first carrier member rotatably supporting a first set of pinion gears that intermeshes with the first sun gear member and the first ring gear member;

and wherein the vehicle includes a second, compound planetary gear set having a second sun gear member, a second ring gear member, and a second carrier member that rotatably supports a second and a third set of pinion gears; wherein the second set of pinion gears meshes with the second ring gear and the third set of pinion gears; and wherein the third set of pinion gears meshes with the second sun gear member;

wherein the first ring gear member is continuously connected for common rotation with the second carrier member; wherein the first carrier member is continuously connected for common rotation with the second sun gear member; and wherein the second ring gear member is configured to receive a driving torque.

13. A vehicle, comprising:

a power source operatively connected to a pair of axially-aligned wheels via a differential mechanism;

a torque distribution system having:

a planetary gear set with a first, a second and a third member;

a motor continuously connected for rotation with the first member;

a selectively engagable clutch that connects the first member for common rotation with the second member; wherein the second member is continuously connected for common rotation with a member of the differential mechanism and with one of the wheels; and wherein the third member is continuously connected for common rotation with the other of the wheels; the motor thus being operable for providing a difference in torque between the wheels when the clutch is not engaged, and for providing torque at both of the wheels when the clutch is engaged.

* * * * *